INVENTOR.
ANTON CHRISTIAN JACOBAEUS
BY Hane and Nydick
ATTORNEYS

Feb. 4, 1969 A. C. JACOBAEUS 3,426,157

CIRCUIT ARRANGEMENT FOR GROUP SELECTORS IN AUTOMATIC TELEPHONE EXCHANGES

Original Filed April 28, 1964

INVENTOR.
ANTON CHRISTIAN JACOBAEUS

BY Hane and Nydick

ATTORNEYS

INVENTOR.
ANTON CHRISTIAN JACOBAEUS
BY Hane and Nydick
ATTORNEYS

INVENTOR.
ANTON CHRISTIAN JACOBAEUS
BY Hane and Nydick
ATTORNEYS

United States Patent Office 3,426,157
Patented Feb. 4, 1969

3,426,157

CIRCUIT ARRANGEMENT FOR GROUP SELECTORS IN AUTOMATIC TELEPHONE EXCHANGES

Anton Christian Jacobaeus, Stockholm, Sweden, assignor to Telefonaktiebolaget L M Ericsson, Stockholm, Sweden, a corporation of Sweden Continuation of application Ser. No. 363,137, Apr. 28, 1964, which is a continuation-in-part of application Ser. No. 126,784, June 21, 1961. This application July 27, 1967, Ser. No. 656,594
Claims priority, application Sweden, June 22, 1960, 6,117/60
U.S. Cl. 179—18 2 Claims
Int. Cl. H04m 3/00

ABSTRACT OF THE DISCLOSURE

A telephone exchange wherein a plurality of line equipments can be connected to establish telephone connections by means of at least markers and a group selector stage. The group selector stages include an array of primary selectors and an array of secondary selectors. There is a primary selector for each of the line equipments and these primary selectors are divided into groups. A plurality of groups of trunks, each of which is associated with one of the primary selector groups. In addition, each of the trunks is associated with one of the secondary selectors. There are also a number of links equal to the number of trunks. One side of the links is available to the primary selectors and the other side of the links is available to the secondary selectors. A marker establishes connections between line equipments via the primary selectors of the associated line equipments, one secondary selector and one link in the group selector stage.

The present application is a continuation of application Ser. No. 363,137 filed Apr. 28, 1964, which is in turn a continuation-in-part of Ser. No. 126,784 filed June 21, 1961, and now abandoned.

This invention relates to group selectors in automatic telephone exchanges and has for an object the reduction of the number of required selectors in a group selector stage composed of primary and secondary selector stages which are connected by means of trunks or links. Each of the lines connected to the group selector stage is connected to a selector in a primary selector stage. The selectors which are assembled into groups are connected, by means of a bundle of trunks for each of said groups, with a secondary selector stage. Such group selector stages are known, for example, according to FIG. 5 and FIG. 6.

In FIG. 5 there are shown three selector stages, A, B and C connected by means of trunks. According to the figure, incoming lines, for example F2, are connected to the selector stage A and outgoing lines, for example F3, are connected to the multiple L of the third selector stage. Two-directional lines, for example F1, are connected to an A-selector as well as to an output, for example L1, in the multiple of a group or horizontal row of C-selectors. In the selector stages A and C- the selectors are grouped in $m$ horizontal rows. The B-selectors are grouped in $k$ vertical columns. A connection between two unidirectional lines will contain three selectors, one in each of the partial selector stages. A connection between the lines F2 and F3 is connected for example by means of the selectors A2, B2 and C1. A connection between two two-directional lines comprises four selectors, only three of which are comprised in the connection itself. The connections are controlled conventionally by markers which are not shown in the figure.

In the circuit arrangement according to FIG. 6 only two selector stages are included, a primary selector stage A and a secondary selector stage B but each connection includes four selectors, for example A1, B1, B2, A2 and a link, for example L1. A connection between, for example, the lines F1 and F2 is established by means of a market (not shown) which sets the $\overline{A}$ selectors A1 and A2 of selector stage A on multiple positions corresponding for example to the B-selectors B1 and B2 of stage B respectively, and sets the selectors B1 and B2 for example on the link L1.

Those lines F1, F2, F3, etc., which are connected in a group selector stage, are often expensive junction lines or represent expensive instruments and form traffic routes within which any idle line may be selected. The lines are always best utilized if the selection can be carried out with full availability without grading. Here it is presupposed that a marker selects a line, any idle line, in a called traffic route after which a determined calling line shall be interconnected with the freely selected line. The interconnection shall occur with a very small probability of A-selectors per horizontal row, viz. $k=2n$, the group tors in FIG. 5 or FIG. 6 is twice as great as the number of A-selectors per horizontal row, viz. $k=2n$, the group selector stage will be completely free from congestion.

If a group selector means that is free from congestion is desired, and if the total number of lines is $m \cdot n$, it will be required, for a connection according to FIG. 5 when only unidirectional lines are provided, that the number of A-selectors be $\frac{1}{2} \cdot m \cdot n$, the number of B-selectors be $m \cdot n$ and the number of C-selectors be $m \cdot n$. The total number of selectors will then be 2.5 $m \cdot n$. If all lines are two-directional, the number of required selectors will be $3 \cdot m \cdot n$ because the number of A-selectors is doubled.

A circuit arrangement according to FIG. 6 requires $3 \cdot m \cdot n$ selectors to operate free from congestion whether the lines are unidirectional or two-directional.

An object to this invention is to reduce the number of required selectors so that a group selector means that is free from congestion only requires $2 \cdot m \cdot n$ selectors independently of whether the lines are unidirectional or two-directional.

The invention satisfies this object by dividing the above mentioned trunks or links within each of the bundles into two equal groups. Each of the trunks of one group is connected to a selector in the secondary selector stage. The trunks or links of the other group are connected to the multiple of the selectors in the secondary selector stage in such a way that each selector in the secondary selector stage can be connected to at least one trunk in the other group of each of the bundles of trunks. Thus each circuit through the group selector stage contains two selectors in the primary selector stage, maximally one selector in the secondary selector stage, and one trunk or link in the other group of one of the bundles.

The invention will be described with respect to the drawing, wherein.

Figure 1:
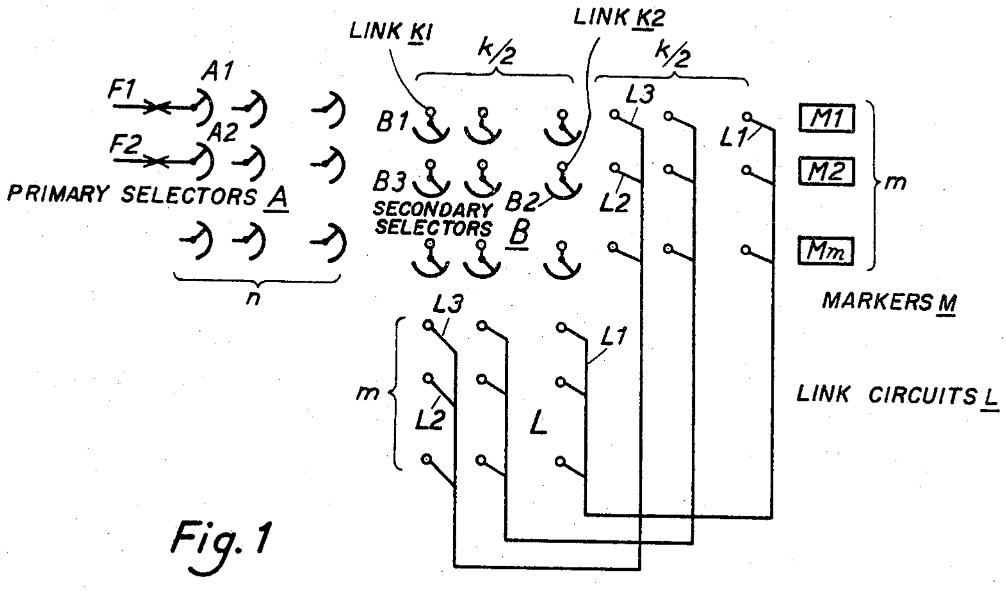
FIG. 1 shows a diagram of the switching paths in a group selector stage according to the invention.

FIG. 1 shows $m \cdot n$ two-directional or unidirectional lines each connected to a selector in a primary selector stage A. The selectors are arranged in $m$ horizontal rows with $n$ A-selectors and $k/2$ B-selectors in each row. Each row of A-selectors comprises a group of A-selectors. Each column of B-selectors comprises a group of B-selectors. The line F1 is thus connected to the selector A1 and the line F2 is connected to selector A2. All A-selectors in, for example that horizontal row which begins with the selector A1, may be connected to the trunks, for example K1 and L1, that are included in the row. For each row the trunks form a bundle of lines which connects the A-selectors with a secondary selector stage B. Within each bundle of lines the trunks are divided into two equally large groups. The trunks of one group, for example K1, are connected to selectors, for example B1, in the selector stage B and the trunks of the other group, for example L1, are connected to the multiple of the B-selectors so that each B-selector can connect to at least one trunk in the other group of each of said bundles. For each horizontal row there is a marker, for example M1, M2 . . . M10.

When a call arrives on for example the line F1, the line will be connected to the marker M1 which receives through the line signals indicating a called traffic route. Lines which belong to the called traffic route are supposed to be located anywhere among the selectors A. The marker connects all lines belonging to the called route, and selects a free line, for example F2. Then the marker M1 connects test wires for all trunks belonging to those rows in which the lines F1 and F2 are provided, and selects a pair of lines comprising a free trunk for each row, which trunks may be interconnected by means of a B-selector. The connection can be carried out in the direction F2 towards F1 as well as in the direction F1 towards F2 which appears from the circuit diagram, FIG. 2. For example the connection F1, A1, K1, B1, L2, A2 and F2, or the connection F2, A2, K2, B2, L1, A1 and F1 will be established.

If $n=k/2$ the group selector means according to FIG. 1 will be free from congestion. If $n>k/2$, congestion will arise, the magnitude of which is determined by the traffic per line (F1, F2) and by the relation between $n$ and $k$.

Figure 3:
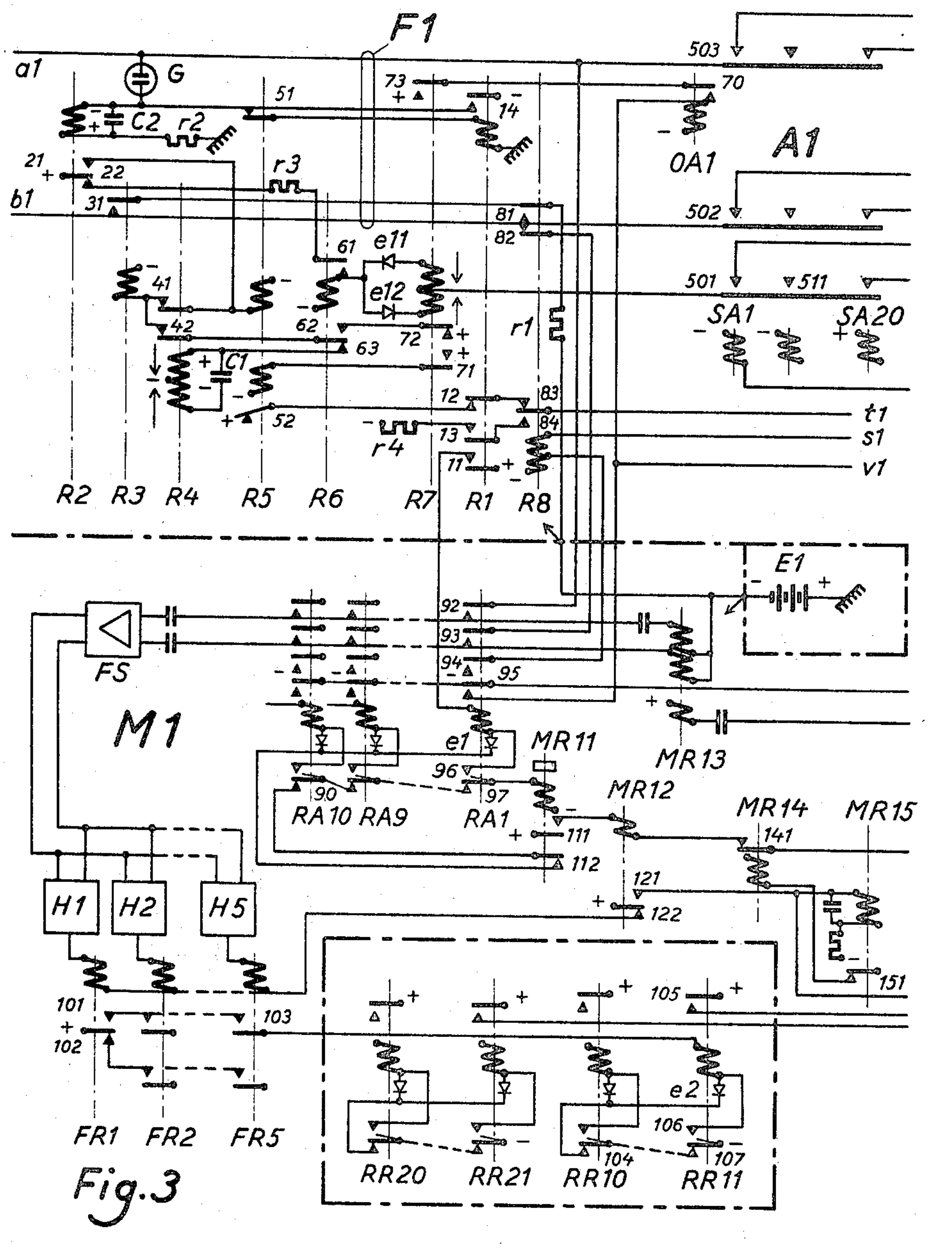
FIGS. 3–4 show a detailed switching operation through the group selector stage of FIG. 1.
Figure 4:
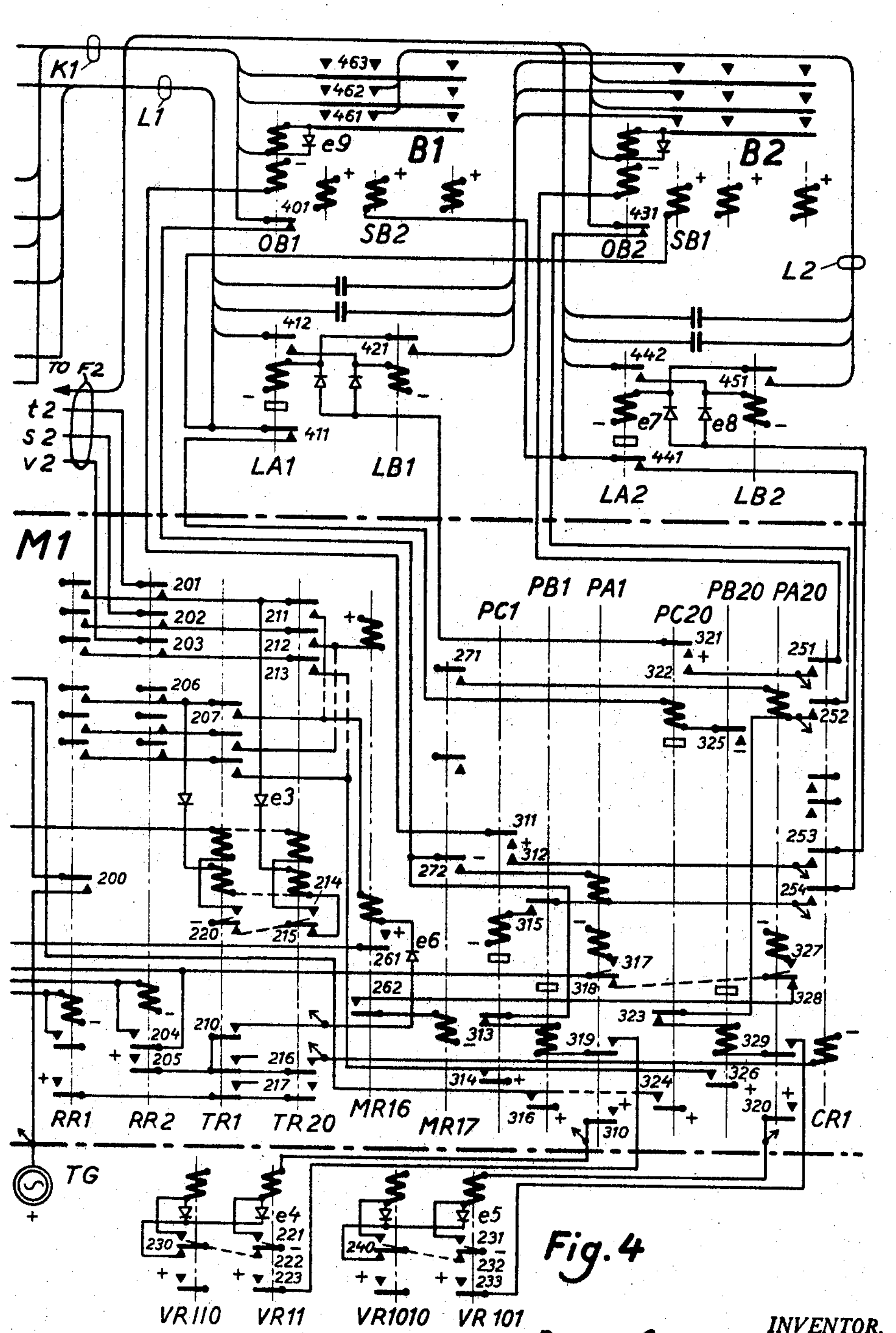
Figure 5:
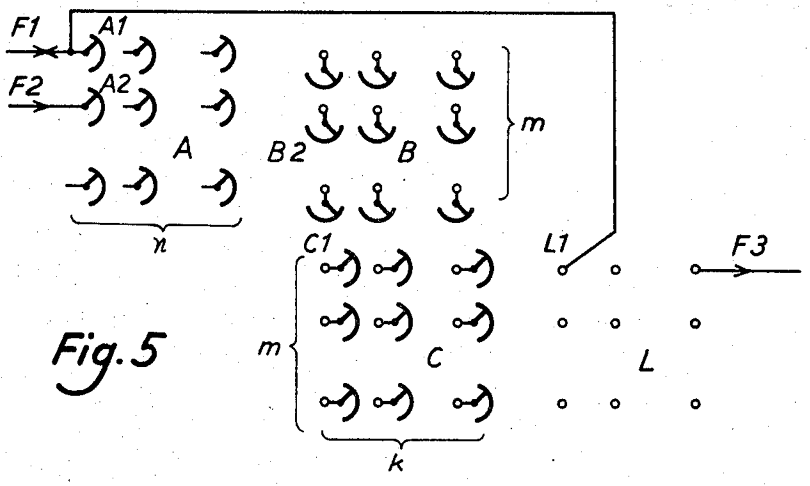
FIGS. 5 and 6 show prior art switching paths.
Figure 6:
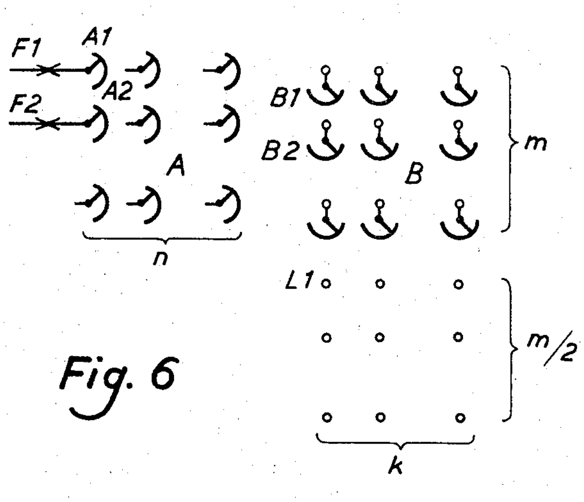

FIGS. 3–4 show circuit arrangements of an intermediate exchange where each line has a line equipment and the trunks are equipped either with a B-selector or with a relay device.

FIG. 3 shows a line equipment including relays R1–R8 of a junction line F1, a selector A1 and identifying relays RA1–RA10 for 10 lines, an amplifier FS and five signal receivers H1–H5 with relays FR1–FR5 in a marker M1. Furthermore, there are shown cut out relays RR11–RR10, RR21–RR20 for traffic routes and some control relays MR11–MR15 for the marker M1.

In FIG. 4 there are shown two B-selectors B1 and B2 and two trunks or links L1 and L2 having relays LA1, LB1 and LA2, LB2 respectively, and connecting relays and test relays for the marker M1. Furthermore there are shown cut out relays VR11–VR110, VR101–VR1010 for the $k/2$ vertical columns having B-selectors as well as links in FIG. 1.

The line equipment including relays R1–R8 in FIG. 3 is intended for a two-directional two-wire junction line F1 through which calling-and-clearing signals are sent with direct current, for example from a battery E1, of rather high voltage so that a glow discharge tube G on the receiver side is ignited. The line F1 is supposed to be provided with substantially equal line equipments in both ends and the line branches $a1$, $b1$ are crossed so that signals which are sent to the line on the wire $b1$, are received at the other end of the line on the wire $a1$. For numerical signals representing, voice frequency combinations are used.

An incoming calling signal on wire A1 ignites the glow discharge tube G after which the fast operating signal-receiving relay R1 operates. The contacts 11–14 are actuated. The slow-operating disconnecting relay R2 is not operated for the present. The electrolytic capacitor C2 begins to be charged and the relay R1 is kept energized by the glow discharge tube G or by the contacts 14 and 51.

The identifying relays RA1–RA10 form a relay chain containing a relay for each A-selector or line in a horizontal row of the selector stage A. Each such row has a marker M1 and the relays RA1–RA10 connect one A-selector at a time to the marker M1 for establishing connection of a telephone communication. The relay RA1 is associated with the line F1 and the selector A1. Relay RA1 operates at the call, if the marker is free, in the following circuit: voltage source+, contact 11, the winding of relay RA1, rectifier $e1$, contacts 112, 90–97, the winding of the slow releasing relay MR11, to the negative voltage source. The relays RA1 and MR11 operate the contacts 92–97 and 111–112 respectively and are held by the contact 96. The calling signal is answered immediately with an answer signal from the battery E1, the intermediate winding of relay MR13, contacts 93, 82, wire $b1$. The relay RA1 is then kept operated so that the answer signal remains on the line during the following switching operation. If the connection is delayed or cannot be carried through, the two signals will turn into clearing signals and the relay R2 of both line equipments is operated as hereinafter described below.

Simultaneously with the calling signal, a voice frequency signal will be received for indicating the traffic route to which the call is directed. The voice frequency signal passes the amplifier FS and operates two of the voice frequency receivers H1–H5 dependent on the voice frequency combination. Corresponding relays, for example relays FR1 and FR5, operate. The contacts 101, 102 and 103 are actuated, implying that the route corresponding to the relay chain RR11–RR10 will be called. In the relay chain RR11–RR10 each marker has one relay, and only one relay at a time can operate. Accordingly only one marker at a time can select a free line in the route. If the route is free, the relay RR1 will operate in a circuit extending through the contacts 101, 103, the winding of relay RR11, rectifier $e2$, and the contacts 104–107. Relay RR11 actuates the contacts 105–107.

The connecting relay RR2 (FIG. 4) operates in a circuit through the contact 105. The contacts 201–205 are actuated whereby the test-and-signal wires of all lines which belong to the called route are connected to the test relays TR1–TR20 of the marker M1.

Figure 2:
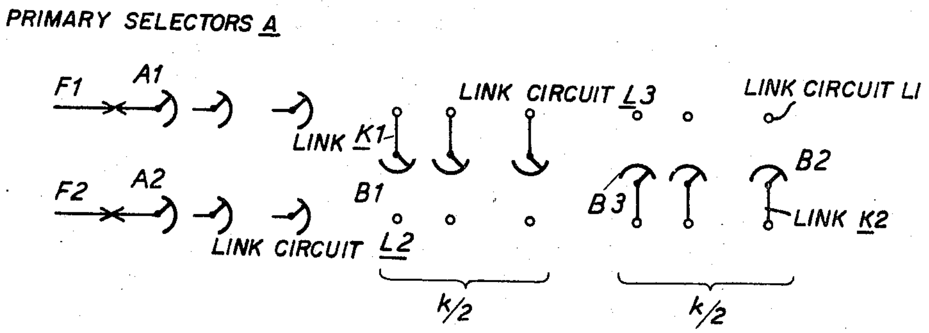
FIG. 2 shows the principle for selecting secondary selectors and links.

Here it is assumed that the line F2 of FIG. 2 belonging to the called route, is free and is selected. The wires $t2$, $s2$, $v2$ in FIG. 4 are connected to the line equipment of F2 and correspond to the wires $t1$, $s1$, $v1$ in FIG. 3. The test circuit is extending from voltage source +, contacts 52, 12 and 83 in the line equipment of F2, wire $t2$, contact 201, rectifier $e3$, the lower winding of relay TR20, contacts 215–220 to negative voltage source. The contacts 211–217 are actuated. The relay MR11 in FIG. 3 operates and relay TR20 is held in the following circuit: voltage source +, contact 111, the winding of relay MR12, contact 141, the upper winding of relay TR20, contacts 214–220 to negative voltage source. The contacts 121–122 are actuated. The relays FR1, FR5 release. The called route is released by restoring the relay RR11.

The relay RR2 is kept energized by the contacts 121 and 204. The selection of a line however terminated by actuating the contact 215 and connecting the selected line F2 to marker M1 by means of the contacts 201–203 and 211–213. As the line F2 is two-directional it must be controlled so that the line is not selected simultaneously at both ends. This occurs during the operating time of relay MR15. Two types of switching operations exist, viz (a) if lines F1 and F2 belong to different markers or rows of A-selectors and (b) if they both belong to the marker M1 and the same relay chain RA1–RA10.

(a) The relay R8 of line F2 operates in the following circuit: voltage source +, the upper winding of relay MR16, contacts 212, 202, wire $s2$, the upper and lower windings of relay R8, to negative voltage source. The lower winding of relay R8 has a large resistance and therefore relay MR16 is not operated. The contacts 81–84 of relay R8 are actuated. A calling signal is sent out on the line F2 through the resistance $r1$ and the contact 81 whereby the relay R1 in the other end of the line is operated and indicates the busy condition of the line by means of its break contact 12. The line F2 is connected to a marker in the called exchange and an answer signal is sent out from the same as has been described above whereby the relay R1 of the calling exchange also operates and its contacts 11–13 are actuated. As all cross-bar switches must be operated from a marker, a contact corresponding to contact 11 in FIG. 3 but belonging to the line F2 causes the line F2 to be connected to its marker M2 in FIG. 1 and a relay corresponding to relay RA1 in FIG. 3 is operated in marker M2. Corresponding contact 94 short-circuits the corresponding lower winding of relay R8. An operating magnet OA2 corresponding to magnet OA1 in FIG. 3 is to be operated from marker M2, as will be described below, together with the operation of selecting magnets for the connection. The contacts 261–262 of relay MR16 are actuated. This switching operation takes a certain time during which the relay MR15 in marker M1 operates and the contact 151 is actuated. If the line F2 had been selected at the same time in both ends, the relays R1 and MR16 would have operated immediately and the following circuit would have been completed: voltage source +, contacts 261 and 151, the winding of relay MR14, to negative voltage source. The contact 141 would have been actuated the relays MR12, TR20 and, RR2 released and then, the selection of line in the called traffic route would have been repeated.

(b) The switching operation will be substantially the same as under (a) but as the line F2 cannot be connected to the marker M1 which already is in a busy condition by means of the line F1, the relay MR16 will be operated in a circuit through its lower winding. Here it is assumed that operation of the relay TR1 in combination with the connecting relay RR2 indicates that a line belonging to the marker M1 has been selected. The following circuit is completed: voltage source +, contacts 205, 210, rectifier *e6*, the lower winding of relay MR16, contacts 207, 206, a conductor in FIG. 3 corresponding to the wire *t1*, contacts 84, 13, and resistance *r4* to negative voltage source.

Here it is presupposed that the relay MR15 has been energized and has operated the contact 151 before the relay MR16 operates its contacts 261–262. The following circuit is completed: voltage source +, contacts 121, 318–328, 262, the winding of relay MR17, to negative voltage source. MR17 operates. The contacts 271–272 of relay MR17 and other contacts are actuated, whereby the test wires of all those B-selectors and links to which the selector A1 can connect, will be connected to the selecting relays PA1–PA20. At the same time the connecting relay CR1 has operated through a circuit through the contacts 205 and 216. The contacts 251–254 and other contacts are actuated and all those links and B-selectors which are connectable to the selected line F2 by means of the selector A2 will be connected to the relays PA1–PA20 so that links and B-selectors are paired according to FIG. 2. The following two circuits are found in FIGS. 3–4.

(1) voltage source +, the winding of selecting bar magnet SB2 of selector B1, contacts 441 and 254, the upper winding of relay PA1, contacts 272, 401, the winding of the selecting bar magnet SA1 of the selector A1 to voltage source. The selecting bar magnet SB2 is connected in parallel with a selecting bar magnet belonging to the selector A2 as the link L2 is connected in the multiple of the B1- or B-selectors in the first column from the left in the B-selector stage as well as to the multiple of A2 or the other row of the A-selector stage.

(2) voltage source +, the winding of selecting bar magnet SA20 of selector A1, contacts 411, 271, the upper winding of relay PA20, contacts 252, 431, the winding of a selecting bar magnet belonging to the selector A2, to a negative voltage source. The selecting bar magnet SA20 is connected in parallel with the selecting bar magnet SB1 belonging to B2 or the B-selectors in the last column from the left in the B-stage as the link L1 is connected to the multiple of A1 as well as in the multiple of B2.

The upper winding of each of the relays PA1–PA20 has a high resistance so that the selecting bar magnets of these circuits are not operated. Here it is assumed that the relay PA1 operates. The contacts 317–319 and 310 are actuated. The relay PA1 points out that the selection has been carried out in the first column from the left in the B-stage, and therefore this column has to be reserved for the marker M1 during the first switching operation. For this purpose there is a relay chain VR11–VR110 and VR101–VR1010 respectively for each column in the B-stage. In each relay chain each marker M1–M10 has one relay, and only one relay at a time may be maintained energized in such a relay chain. The contact 310 closes a circuit for the relay VR11 through the rectifier *e4* and the contacts 230–222. When the column is free, relay VR11 will operate and the contacts 221–223 are actuated. In each column there are always two switching possibilities, for example B1, L2 and B3, L3 in FIGS. 1–2 when interconnecting the lines F1 and F2 in the first column from the left in the B-stage. Two relays PA1 and the immediately following relay (PA2) which is not drawn in FIG. 4, thus operate the same cut out relay VR11.

When the relay VR11 has operated, the connection between the lines F1 and F2 can be established. The following circuit is completed: voltage source +, contacts 223, 319, the winding of relay PB1 which has a low resistance and operates slowly, contacts 313–401, the winding of selecting bar magnet SA1, to negative voltage source. The selecting bar magnet SA1 operates first and the relay PB1 later. The contacts 315–316 are actuated. The operating bar magnet OA1 of the selector A1 operates. The contacts 501–503 and 70 are actuated. At the same time the selecting bar magnet SB2 and the selecting bar magnet of the selector A2, corresponding to the link L2, as shown in FIG. 1 but not drawn in FIG. 4, will operate through the following circuit: voltage source +, winding of magnet SB2 and the mentioned other selecting bar magnet of link L2, connected in parallel with magnet SB2, contacts 441, 254, 315, winding of relay PC1, to negative voltage source. The winding of relay PC1 has a low resistance and relay PC1 is slow to operate. The two selecting bar magnets belonging to the link L2 operate first and then the relay PC1. The contacts 311–314 are actuated. The contact 313 breaks the current of that selecting bar magnet SA1 in the selector A1 which has been operated earlier so that this indication becomes disconnected. This is necessary if the selectors A1 and A2 are located in the same row. The operating bar magnet OA2 (not shown in the figures) of the selector A2 operates in the following circuit: voltage source +, contacts 314, 213 and 203, wire *v2* that corresponds to wire *v1* in FIG. 3, winding of bar magnet OA2 that corresponds to bar magnet OA1 in FIG. 3, to negative voltage source. At the same time the operating bar magnet OB1 of the selector B1 will operate in a circuit extending through the contact 311, and the link relays LA2, LB2 in a circuit extending through the contacts 312, 253, and the rectifiers *e7* and *e8* respectively. The relay LA2 operates with a certain delay. The contact 451 and the selecting contacts 461–463 are actuated and then the contacts 441–442. Then a connection between the lines F1 and F2 is established and the marker M1 shall be released. For holding the established connection and for releasing the marker M1 and those line multiples which have been blocked during the connection, the following circuits will be closed: voltage source +, contacts 312, 253, rectifiers *e7* and *e8* respectively, contacts 451 respectively 442, 461 in the selector B1 and the rectifier *e9* to contact 501 in the selector A1, respectively to a contact on the selector A2, corresponding to contact 511 in A1. The current paths will pass one through the line equipment of line F1 and the other through the line equipment of line F2 and the upper winding of relay R7, rectifier *e11*, winding of relay R6, to negative voltage source. In both line equipments the relays R6 and R7 operate. The contacts 61–63 and 71–73 are actuated. The operating bar magnet OA1 is kept operated by the contacts 73 and 70. The relay R6 is held by a circuit extending through the contact 22, resistance *r*3 and contact 61. The relay R5 is operated by the contact 71. Contacts 51–52 are actuated. The signal receiving relay R1 is disconnected. Then the relays RA1, MR11–12, RR2, TR20, MR16, PA1, PB1, PC1, VR11, and CR1 will release and the marker becomes free for the next call.

Each of the link relays LA2 and LB2 is held from a line equipment for the lines F1 and F2 respectively. Thus the following circuit is closed from the line F1 to the link L2: voltage source +, contact 22, resistance *r*3, contact 61, rectifier *e*12, the lower winding of relay R7, contact 501, the upper winding of the operating bar magnet OB1, contacts 461 and 451, winding of relay LA2, to negative voltage source. The relay LB2 is held in a corresponding circuit through the contact 442. The operating bar magnet OB1 is held in said circuit by the upper winding of bar magnet OB1.

The connections are generally controlled from registers in an output exchange and the first voice frequency signal that is sent from the register indicates a group of rural telephone networks or a called exchange. Signals sent backwards are herewith necessary to indicate when the called exchange has been reached. The connecting relay RR1 in FIG. 4 belongs, by way of example, to a traffic route running to a local exchange, and a signal sent backwards shall indicate that the local number of that subscriber within the local exchange which is called, shall be sent instead of the voice frequency signal of the local exchange. When the relay RR1 operates, a contact 200 among other contacts is closed and a voice frequency signal is sent from the voice frequency generator TG through the lower winding of relay MR13. This voice frequency signal is transformed through the windings of the relay MR13 to the talking wires *a*1, *b*1 and is received by a signal receiver in the register of the output exchange. Signals sent backwards may of course be sent with a voice frequency which does not operate the voice frequency receivers H1–H5.

The relay R2 in FIG. 3 is used for disconnecting the connection. The winding of relay R2 is connected in parallel with an electrolytic capacitor C2 and is connected in series with a resistance *r*2, and therefore the operating time of the relay will be long with respect to the normal working time of the marker. The relay R2 may be operated by each signal that ignites the glow discharge tube G and is in progress for a sufficiently long time, whether the signal starts as a calling signal, an answer signal or as a clearing signal. When the relay R2 operates, the line F1 shall always be released. The contacts 21–22 are actuated.

The contact 22 breaks the holding circuit of the relays R6, R7, the operating bar magnet OB1 and of the link relay LA2 which release. The contact 21 closes the circuit extending through the upper winding of relay R5 and through the contact 41 to the winding of the relay R3 which operates. The contact 31 is closed. An answer signal is sent from the battery E1 through the contact 31 to the line branch *b*1. The answer signal remains on the line until the incoming clearing signal ceases and the relay R2 releases or until the relay R4 operates in the circuit through the contacts 21, 41, 42, 63. The relay R4 has two windings which counteract each other and are interconnected by means of an electrolytic capacitor C1. Accordingly, the relay has a long operating time and a long release time. The operating time is greater than the operating time of relay R2. The capacitor C1 is charged and when the relay R4 operates, the contacts 41–42 will be actuated. The relay R3 releases and the relay R4 is maintained energized by the electrolytic capacitor C1 until it has been discharged by the windings of R4 which windings now cooperate. The relay R5 releases and the line F1 is marked free by the contacts 51 and 52.

What is claimed is:

1. Switching means in an automatic telephone exchange for serving a plurality of lines F1, F2 which form a plurality of routes, comprising a first selector stage A including a plurality of primary selectors, each of said primary selectors being associated with one of said lines, a second selector stage B including a plurality of secondary selectors, and one link K for each secondary selector joining said first and said second selector stages; link circuits (L1, etc.) each available at its one end to primary selectors in said first selector stage and at the other end to secondary selectors in said second selector stage, and marker means M establishing connections between first and second lines F1, F2 in different routes via said first and said second selector stages, each of said connections including the primary selector A1 connected to said first line F1, the primary selector A2 connected to said second line F2, one of said secondary selectors, the link associated with said one secondary selector and one of said link circuits.

2. Switching means according to claim 1, wherein said plurality of primary selectors are divided into *m* primary selector groups, each of said primary selector groups having *n* primary selectors, and said plurality of secondary selectors being divided into *n* secondary selector groups, each secondary selector group comprising *m* selectors; said link circuits being divided into *n* groups each of which comprises *m* link circuits; the selecting capacity of each primary selector being 2n, and *n* secondary selectors and *n* link circuits being available for each primary selector; the selecting capacity of each secondary selector being at least *m* link circuits.

References Cited

UNITED STATES PATENTS 2,999,131 9/1961 Edstrom ............ 179—18

KATHLEEN H. CLAFFY, *Primary Examiner.*

L. A. WRIGHT, *Assistant Examiner.*